(12) United States Patent
Moore et al.

(10) Patent No.: US 7,398,329 B2
(45) Date of Patent: Jul. 8, 2008

(54) PIPELINED I/O EXECUTION

(75) Inventors: William H. Moore, Fremont, CA (US); Jeffrey S. Bonwick, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 278 days.

(21) Appl. No.: 11/407,587

(22) Filed: Apr. 20, 2006

(65) Prior Publication Data

US 2007/0150624 A1 Jun. 28, 2007

Related U.S. Application Data

(60) Provisional application No. 60/733,380, filed on Nov. 4, 2005.

(51) Int. Cl.
*G06F 9/30* (2006.01)
*G06F 3/00* (2006.01)

(52) U.S. Cl. .......................... 710/5; 710/219; 710/233; 712/201; 718/106

(58) Field of Classification Search .................. 710/5–7, 710/29; 712/16–22, 200–207, 216–219, 712/233–237; 718/105–107
See application file for complete search history.

(56) References Cited

U.S. PATENT DOCUMENTS

| | | | | |
|---|---|---|---|---|
| 4,750,112 A | * | 6/1988 | Jones et al. | 712/217 |
| 5,212,782 A | * | 5/1993 | Asato et al. | 716/6 |
| 5,546,551 A | * | 8/1996 | Kohn | 707/102 |
| 5,564,029 A | * | 10/1996 | Ueda et al. | 712/216 |
| 5,606,676 A | * | 2/1997 | Grochowski et al. | 712/239 |
| 5,673,425 A | * | 9/1997 | Iwashita | 712/227 |
| 5,778,246 A | * | 7/1998 | Brennan | 712/23 |
| 5,778,250 A | * | 7/1998 | Dye | 712/32 |
| 6,073,159 A | * | 6/2000 | Emer et al. | 718/103 |
| 2004/0064682 A1 | * | 4/2004 | Nguyen et al. | 712/226 |
| 2005/0283756 A1 | * | 12/2005 | O'Dwyer | 717/109 |
| 2006/0095729 A1 | * | 5/2006 | Hokenek et al. | 712/214 |

\* cited by examiner

*Primary Examiner*—Christopher B. Shin
(74) *Attorney, Agent, or Firm*—Osha Liang LLP

(57) ABSTRACT

A method for pipelining execution input/output (I/O) includes obtaining a first I/O operation, determining a first plurality of stages of a pipeline needed to execute the first I/O operation, and executing each of the first plurality of stages to complete the I/O operation, wherein the first plurality of stages is a subset of a plurality of stages associated with pipeline, and wherein each of the first plurality of stages of the pipeline is executed in sequence.

20 Claims, 6 Drawing Sheets

PIPELINED I/O EXECUTION

CROSS-REFERENCE TO RELATED APPLICATIONS

This application claims benefit of U.S. Provisional Application Ser. No. 60/733,380 filed on Nov. 4, 2005, entitled "PIPELINED I/O EXECUTION, I/O DEPENDENCY GRAPHS, AND I/O PRIORITY INHERITANCE" in the names of William H. Moore and Jeffrey S. Bonwick.

BACKGROUND

In computing, a pipeline is a set of data processing elements connected in series, so that the output of one element is the input of the next. A pipeline is divided into segments or stages, and each segment can execute its operation concurrently with the other segments. When a segment completes an operation, a result is passed to the next segment in the pipeline and fetches the next operation from the preceding segment. The final results of each instruction emerge at the end of the pipeline in rapid succession. Pipelining is also known as pipeline processing.

An everyday example of a pipeline is a factory assembly line. For example, if a car were being assembled using the stages of engine installation, hood installation, and wheel installation, The car would go through each stage in that order. First, the car would have its engine installed, then move on to the hood installation, letting a second car proceed with the engine installation. Then the first car would go to wheel installation, the second car to hood installation, and a third car would begin engine installation. Using this method, all three cars can be completed in less time than it would take if only one car were operated on at once.

Examples of computer-related pipelines include instruction pipelines, graphics pipelines, and software pipelines. Instruction pipelines are used in processors to allow two or more consecutive instructions from a nominally sequential stream to be executed in parallel. In this case, the segments of data processing elements in the pipeline are the logic circuits that implement the various stages of an instruction, such as address decoding and arithmetic, register fetching, and cache lookup. While instruction pipelines were once only used in high performance and RISC processors, such pipelines are now common in microprocessors used in personal computers.

Graphics pipelines are found in most graphics cards, which are made up of multiple arithmetic units or CPUs that implement the various stages of rendering operations. A graphics pipeline commonly reads in a representation of a 3D scene as input and outputs a 2D raster image at the end of the pipeline. Stages of the graphics pipeline include modeling transformation, lighting, viewing transformation, projection transformation, and rasterization. A 3D scene can be passed to a graphics pipeline as a set of vertices, which can be considered independent. This allows all stages of the pipeline to be used on different sets of vertices as they work their way through the stages. In addition, graphics processors may use parallel processing units to process multiple vertices in a single stage of the pipeline at the same time.

Software pipelines include multiple processes that are arranged so that the output stream of one process is fed as the input stream of the next one. A buffer is usually provided between consecutive elements so that one process can provide more data than the next is willing or able to receive. A typical example of a software pipeline is a Unix shell pipeline.

SUMMARY

In general, in one aspect, the invention relates to a method for pipelining execution input/output (I/O), comprising obtaining a first I/O operation, determining a first plurality of stages of a pipeline needed to execute the first I/O operation, and executing each of the first plurality of stages to complete the I/O operation, wherein the first plurality of stages is a subset of a plurality of stages associated with pipeline, and wherein each of the first plurality of stages of the pipeline is executed in sequence.

In general, in one aspect, the invention relates to a system for data management pipelining execution of I/O operations, comprising, a first (input/output) I/O operation, and a pipeline comprising a plurality of different stages, wherein the pipeline is configured to complete the first I/O operation by executing the stages of the pipeline corresponding to the first I/O operation, wherein each of the stages of the pipeline is executed in sequence.

In general, in one aspect, the invention relates to a computer usable medium having computer readable program code embodied therein for causing a computer system for executing a method for data management pipelining execution of input/output (I/O), comprising computer readable program code to obtain a first I/O operation, determine a first plurality of stages of a pipeline needed to execute the first I/O operation, and execute each of the first plurality of stages to complete the I/O operation, wherein the first plurality of stages is a subset of a plurality of stages associated with pipeline, and wherein each of the first plurality of stages of the pipeline is executed in sequence.

Other aspects of the invention will be apparent from the following description and the appended claims.

DETAILED DESCRIPTION

Figure 1:
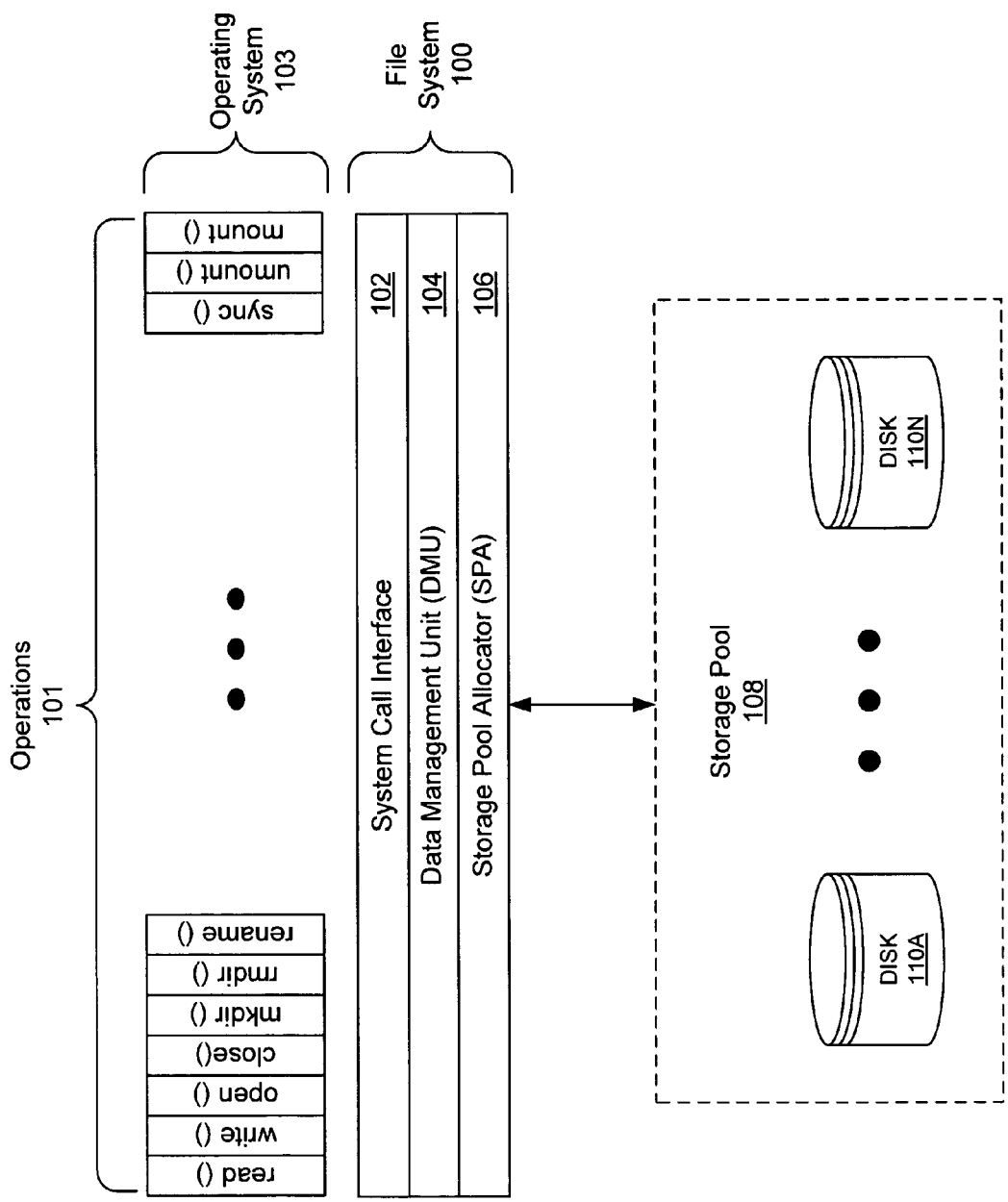
FIG. 1 shows a system architecture in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
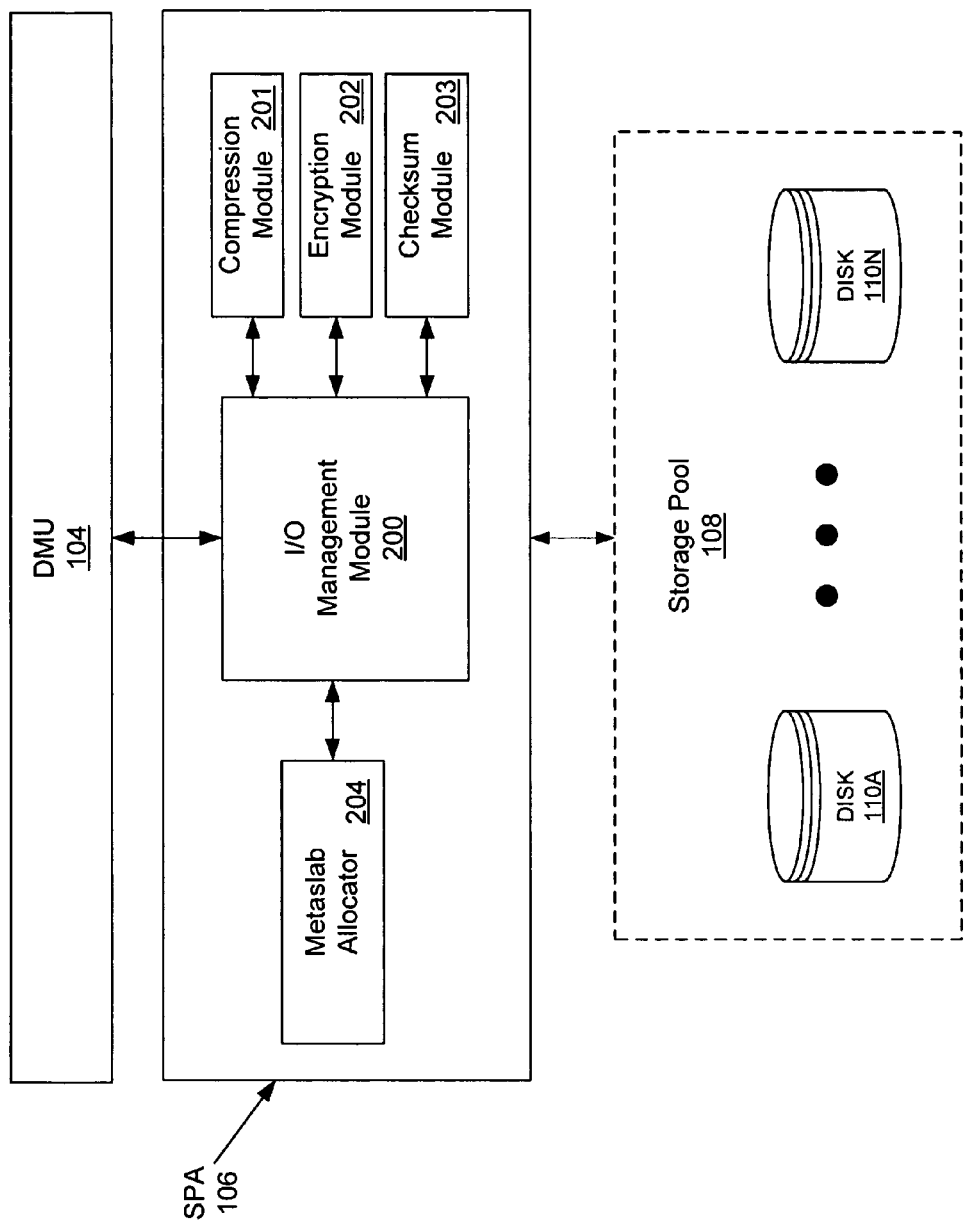
FIG. 2 shows a storage pool allocator in accordance with one or more embodiments of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules as described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
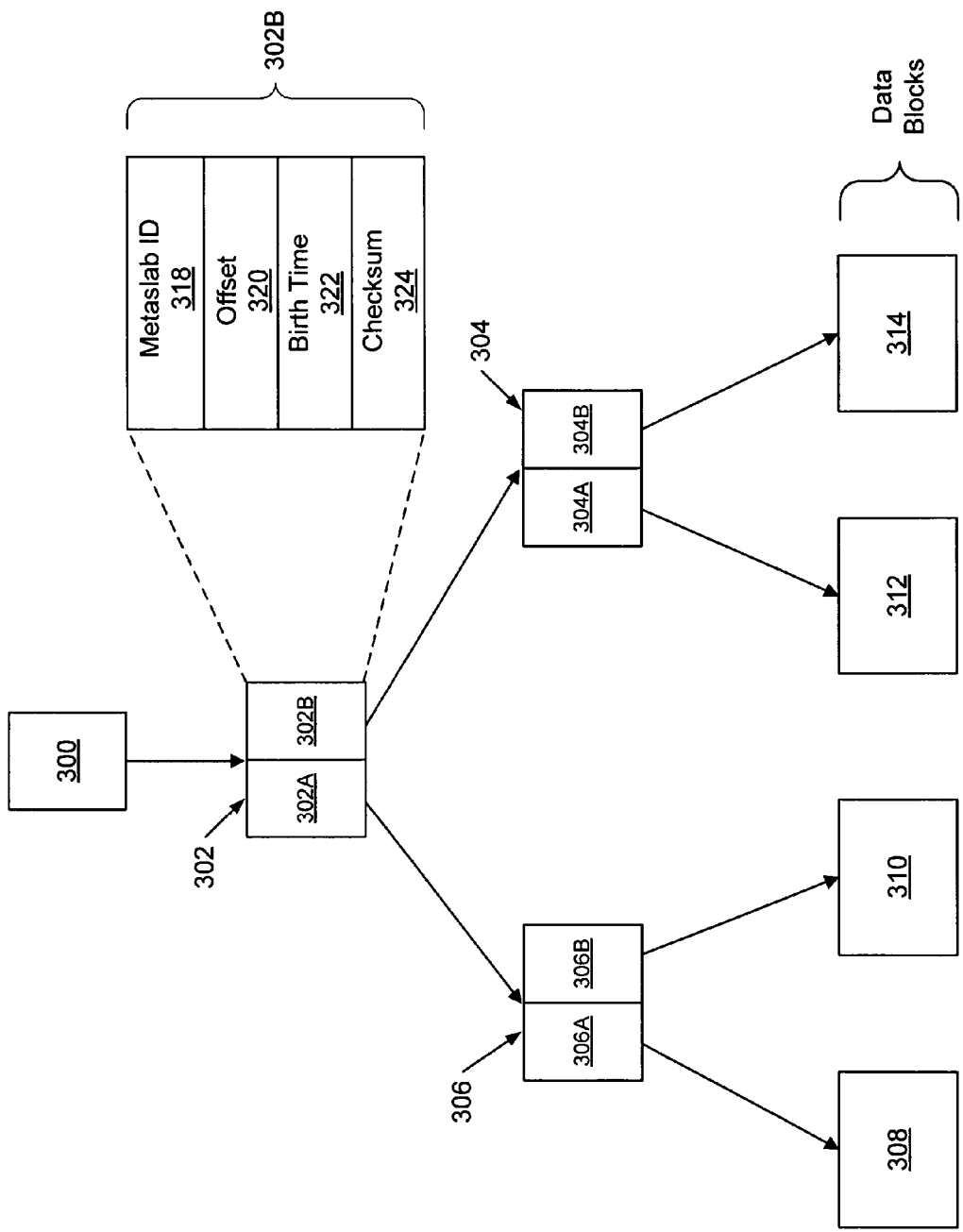
FIG. 3 shows a hierarchical data configuration in accordance with one or more embodiments of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth time (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where the disk the metaslab begins. The offset (320) may then be used to reference a particular segment within the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

In general, embodiments of the invention provide a method and system for pipelining execution of I/O operations where an I/O operation is broken down into different stages of a pipeline, and the resulting stages are executed sequentially. In one or more embodiments of the invention, this pipelined execution is used to facilitate the operation of a file system, as described above and shown in FIGS. 1-3. One skilled in the art will appreciate that the I/O operation may be an instruction, a system call, or other similar mechanisms to satisfy the input or output requirements of a computer system (or an application executing on the computer system).

In one or more embodiments of the invention, pipelining is used for executing I/O within a file system. In one or more embodiments of the invention, an I/O operation within the file system is broken up into a series of simple, discrete, and well-defined stages of a pipeline necessary to complete the I/O operations. For example, the I/O operation may be broken into several stages, such as compression, allocation, checksumming, writing to disk, etc. These stages are then executed separately (as stages in the pipeline) in sequence, one at a time. The operation may be suspended at any stage of its execution, without consuming a thread context. This is very important for scalability; a file system can have tens of thousands of I/O operations, while only using a few threads of execution to move the operations through the necessary pipeline stages. Suspending operations also allows an I/O operation to be executed asynchronously from the caller that initiated the I/O command. This is important because the caller's I/O issue rate would otherwise be limited by a single CPU's ability to (for example) compress and checksum the data, even though other CPU's are idle.

In one or more embodiments of the invention, I/O pipelining allows for easy expression of an arbitrarily complex I/O as a composition of simple pipeline stages, with each I/O operation only executing the stages relevant to its completion. For example, if the block requested to be read is compressed, the decompression stage is added to the I/O operation's pipeline. With each stage in the pipeline being simple and directed to a single-purpose, most conditionals in the code path are eliminated and the file system can avoid the combinatorial explosion of conditional statements making the implementation of a file system challenging.

Figure 4:
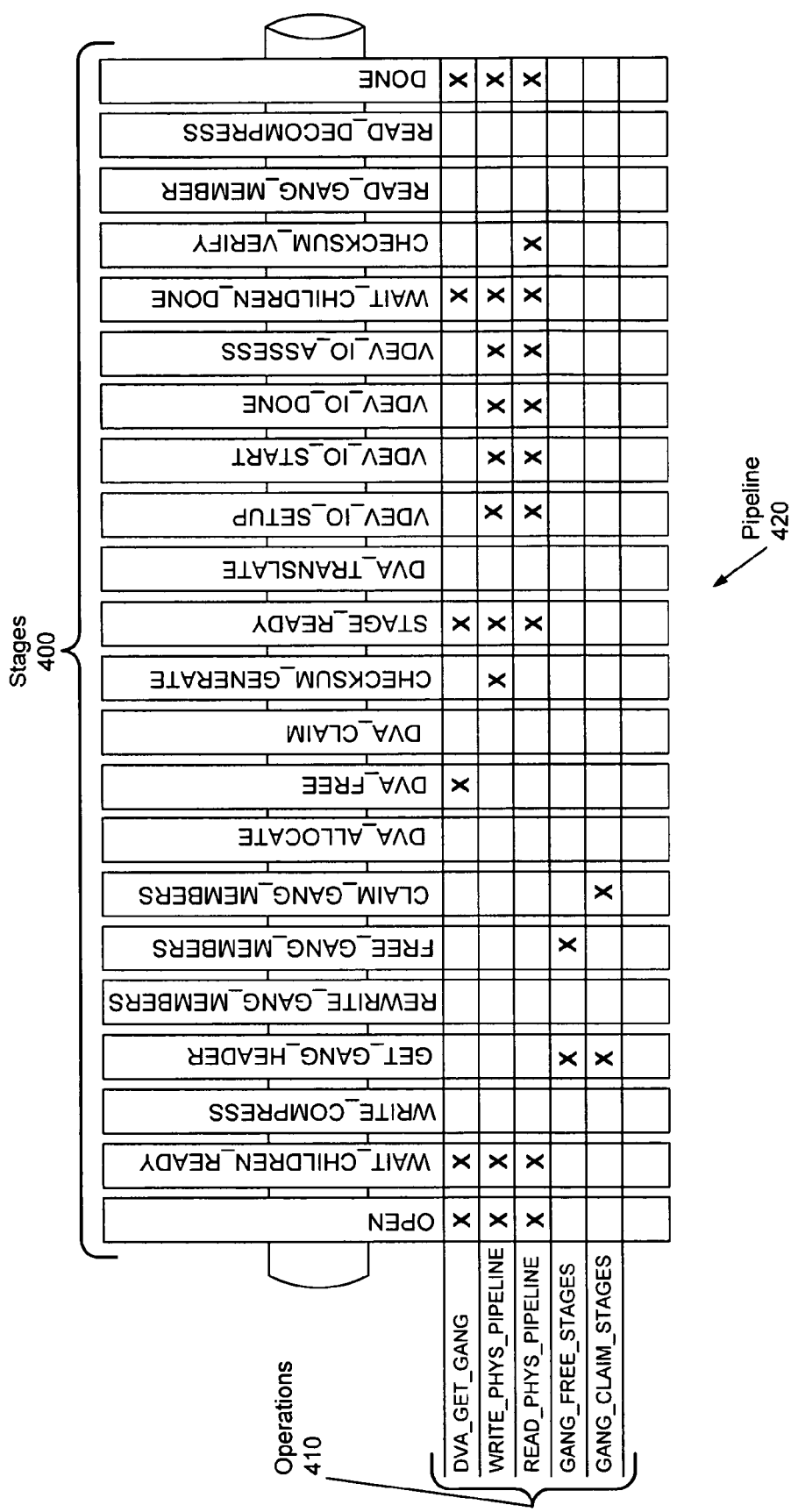
FIG. 4 shows a diagram of an I/O pipeline in accordance with one or more embodiments of the invention.

For example, FIG. 4 shows a diagram of a pipeline for a file system in accordance with one or more embodiments of the invention. In one or more embodiments of the invention, the pipeline (420) is used to execute I/O. I/O operations can be received as a request from an application. In one or more embodiments of the invention, each operation (410) is completed by executing one or more of the stages (400) shown in the pipeline (420). The pipeline (420), shown in FIG. 4, includes 22 stages (400). Each of these stages (400) is discrete, simple, and directed to a single-purpose. As a whole, the pipeline (420) contains everything needed to perform any I/O operation (410). Any individual I/O operation (410) will contain a subset of the stages in the pipeline. Furthermore, different operations (410) are performed based on the combination of stages (400) selected. In one or more embodiments of the invention, the stages to be executed for an I/O are stored on a 32 bit word. A bit set to 1 corresponds to a stage that needs to be executed in the I/O operation. A bitmask may be used to discover which stages are needed for a given I/O using the bitwise AND operation. Similarly, a bitmask may be used to set bits of the 32 bit word using the bitwise OR operation.

For example, the WRITE_PHYS_PIPELINE operation requires the OPEN, WAIT_CHILDREN_READY, CHECKSUM_GENERATE, STAGE_READY, VDEV$_{IO}$_SETUP, VDEV_IO_START, VDEV_IO_DONE, VDEV_IO_ASSESS, WAIT_CHILDREN_DONE, and DONE stages to perform the operation. In a 32 bit word, this may correspond to the binary string 11000000001101111100010000000000. The ten trailing zeroes correspond to extra bits not related to stages in the pipeline, since the pipeline only has 22 stages. Those skilled in the art will appreciate that the bits corresponding to stages of the pipeline may be ordered in various ways, including most significant bit first, least significant bit first, etc. Furthermore, the 10 bits not related to stages in the pipeline may be found at the beginning of the word, end of the word, or even interspersed in between.

Stages of the WRITE_PHYS_PIPELINE operation, as well as other I/O operations in the pipeline, are performed one after another in order. The OPEN stage establishes the beginning of execution of the WRITE_PHYS_PIPELINE operation. Once that has completed, the WRITE_PHYS_PIPELINE operation moves to the WAIT_CHILDREN_READY stage. Here, the operation waits for any dependencies, or children, it might have to ready themselves for execution of instructions. In one or more embodiments of the invention, built in interlocks exist for the children of I/O operations. If the children of an I/O operation are not ready, then the pipeline stalls at the WAIT_CHILDREN_READY stage. The thread executing the pipeline leaves the I/O operation stalled and proceeds to accomplish another task. Once the children are ready, they notify the I/O operation, and once all children are ready, execution is resumed by obtaining a thread and using it to run the I/O operation. Using these interlocks, threads are only consumed when the pipeline is executing and never when the pipeline is blocked.

Once all children have signaled that they are ready, the WRITE_PHYS_PIPELINE operation moves to the CHECKSUM_GENERATE stage. Here the operation generates a checksum that can be used to validate data integrity later, for example in a read operation. In one or more embodiments of the invention, the checksum is stored as part of the metadata in an indirect block, as explained above. Data blocks pertaining to the WRITE_PHYS_PIPELINE operation and referenced by the indirect block are written to later in the pipeline. After the checksum is generated, the operation goes to the STAGE_READY stage, which indicates that the operation as well as all of its dependencies are ready.

Once the WRITE_PHYS_PIPELINE operation is ready, it goes to the VDEV_IO_SETUP stage. Here, setup work for the I/O write is done. Vdev is short for "virtual device", and the Vdev subsystem provides a unified method of arranging and accessing devices on the file system. Vdevs are responsible for representing the available space as well as laying out blocks on physical disks, as described above. As a result, the VDEV stages of the pipeline accomplish the actual I/O to and from the physical disks of the file system.

Once the Vdev subsystem has been set up, the VDEV_IO_START stage is executed. This sends the I/O to the mirror or disk device. In the case of WRITE_PHYS_PIPELINE, a write operation is conducted on one or more disks using the Vdev subsystem. Once the writing is complete, the operation moves to VDEV_IO_DONE. VDEV_IO_ASSESS is then run to check for errors and retry the I/O operation if needed. For example, if a device was unresponsive at VDEV_IO_START and the I/O operation was unable to proceed, VDEV_IO_ASSESS would then check the device and attempt once again to conduct the I/O.

Once the VDEV stages have completed, the WRITE_PHYS_PIPELINE operation moves onto the WAIT_CHILDREN_DONE stage. Here, the operation waits for any dependencies or children it has to finish and return any errors found during their execution. Once everything is finished, the operation moves to the DONE stage and exits the pipeline.

As shown in FIG. 4, other operations (e.g., DVA_GET_GANG, READ_PHYS_PIPELINE, GANG_FREE_STAGES) may be performed by selecting the appropriate combination of pipeline stages (400). Furthermore, multiple operations may operate on the pipeline in parallel. For example, a WRITE_PHYS_PIPELINE operation may be executing the CHECKSUM_GENERATE stage at the same time that a READ_PHYS_PIPELINE may be executing the CHECKSUM_VERIFY stage, as long as one does not depend on the other. Multiple I/O operations may also execute the same stage at the same time. This may occur when multiple operations contain a common stage in their execution, even if there are dependencies between the operations. For example, if a READ_PHYS_PIPELINE operation depended on a WRITE_PHYS_PIPELINE operation to complete first before proceeding, both operations may be in the WAIT_CHILDREN_READY stage; the READ_PHYS_PIPELINE operation would be waiting on its children, which include the WRITE_PHYS_PIPELINE operation, and the WRITE_PHYS_PIPELINE operation may be waiting on any children it has. The common stage between the two operations would be the WAIT_CHILDREN_READY stage. A less complicated example would be several I/O operations initializing at the same time in the OPEN stage.

Figure 5:
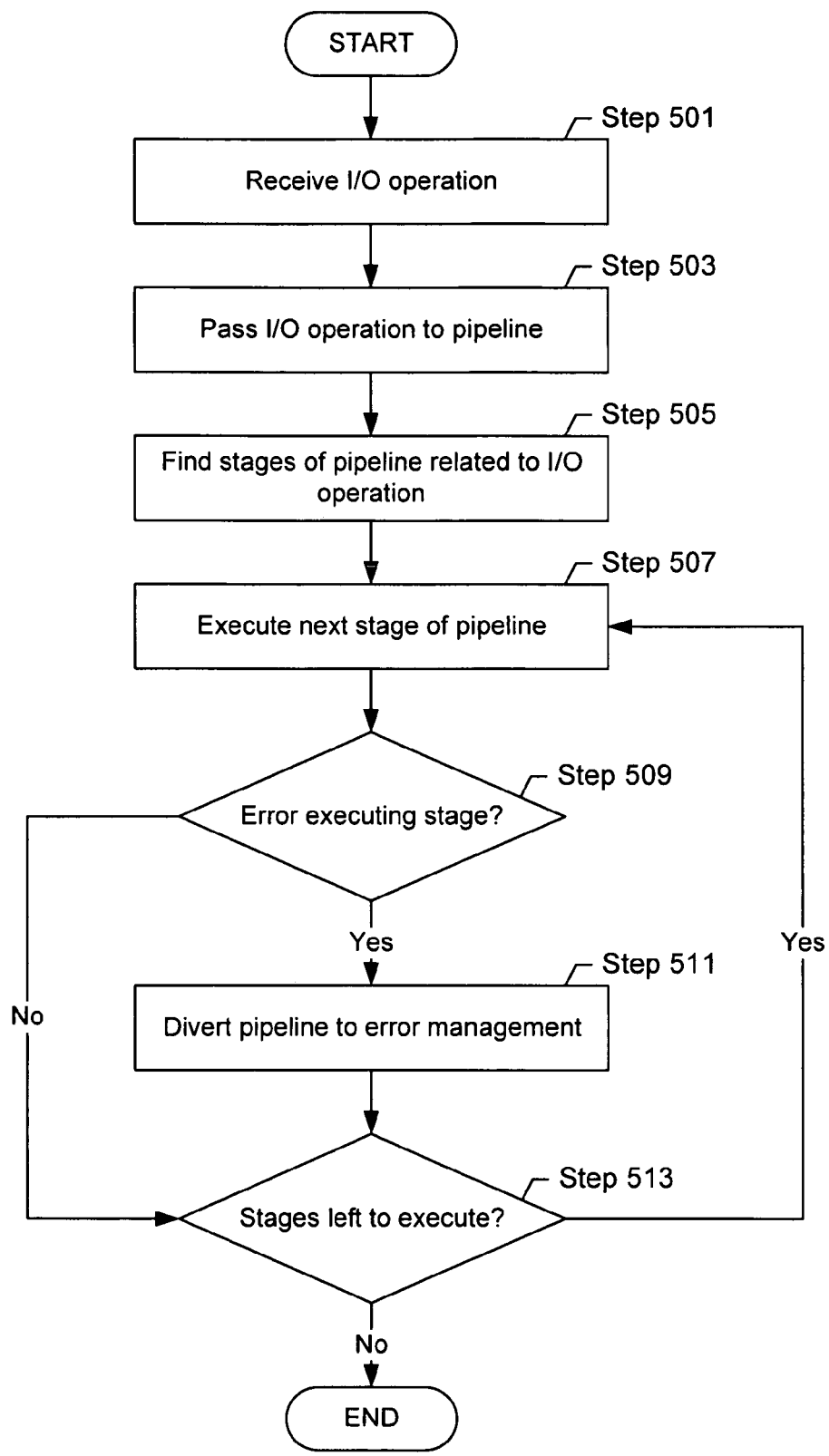
FIG. 5 shows a flow diagram of an I/O operation executing in a pipeline in accordance with one or more embodiments of the invention.

FIG. 5 shows a flow diagram of an I/O operation executing in a pipeline in accordance with one or more embodiments of the invention. First, an I/O operation is received (Step 501). As stated above, the I/O operation may be received as a request from an application or user. Next, the I/O operation is passed to the pipeline (Step 503) and stages of the pipeline related to the I/O operation found (Step 505). Also as stated above, the stages may be represented as a 32 bit word with set bits corresponding to stages that require execution to perform the I/O operation. If the I/O operation required one more stage (e.g., compression or decompression in a read or write) adding that stage is a matter of changing one bit, instead of rewriting and restructuring the I/O code.

Once the stages of the pipeline needed to carry out the I/O operation have been determined, the pipeline begins by executing the next stage (Step 507). In the beginning of the pipeline, this would be the first stage, which in FIG. 4 would most likely involve the OPEN stage. Once a stage is executed, an error check is conducted (Step 509) to determine whether any problems occurred in the stage. In one or more embodiments of the invention, the error detection and pipeline stage advancement are accomplished by a common piece of code. In one embodiment of the invention, if an error is detected, then a bitmask may be applied to the word defining the pipeline stages the I/O operation was intended to execute. When the bitmask is applied, the word is modified such that only stages required to exit from the pipeline are executed. For example, the word (after the mask is applied) may only execute the done stage, where execution of the done stage notifies the caller that the I/O operation failed and also may notify any children or parents of the I/O operation that the I/O operation failed.

If no problems occur during the execution of the current stage, the error detection/pipeline stage advancement code determines whether any stages are left that need to be executed (Step 513). This determination may be performed by applying bitmasks to the 32 bit word corresponding to the pipeline stages of the I/O operation and determining if there are any bits set after the current stage. If so, the next stage corresponding to a set bit is executed (Step 507) and an error check is run for each stage (Step 509) until no stages remain that require execution of the I/O operation. One skilled in the art will appreciate that, as shown in FIG. 4, most I/O operations are completed with the DONE stage.

If an error is found while executing a stage, the common code diverts the pipeline to error management (Step 511). Instead of executing the next scheduled stage in the pipeline, which may cause further problems, a minimum error pipeline is used, thereby preventing additional errors from occurring until the current issues have been resolved. In one or more embodiments of the invention, pipeline interlocks as discussed above aid in error management of the I/O pipeline (Step 511). In the case of an error at WAIT_CHILDREN_READY, pipeline interlocks stall the I/O operation until all children have reported ready.

Embodiments of the invention have one or more of the following advantages. Embodiments of the invention inherently provide interlocks for error management without complex coding (e.g., waiting for the completion of children nodes before further pipeline execution). Further, embodiments of the invention provide automatic error detection at each pipeline stage instead of waiting for the completion of the operation or entire I/O command. Embodiments of the invention also provide support for I/O re-tries, as done in the VDEV_IO_ASSESS stage. Furthermore, the pipeline structure allows each stage to be coded and extended in a simple and straightforward manner as opposed to traditional complex, convoluted, and error-prone functions that handle I/O. I/Os are also easily changed by altering the bits corresponding to their pipeline stages rather than adding new code.

Figure 6:
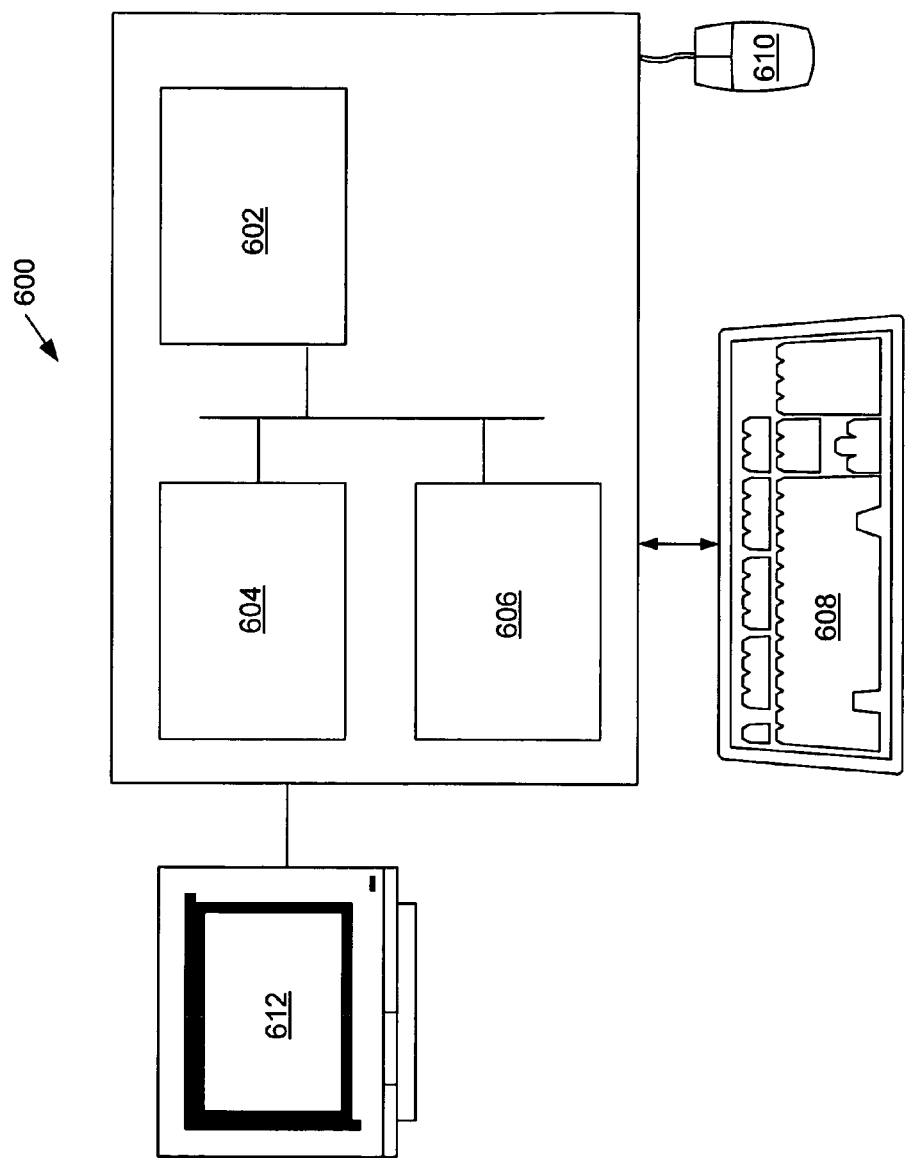
FIG. 6 shows a computer system in accordance with one ore more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., pipeline, I/O operations, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for pipelining execution input/output (I/O), comprising:
   obtaining a first I/O operation;
   determining a first plurality of stages of a pipeline needed to execute the first I/O operation; and
   executing each of the first plurality of stages to complete the I/O operation,
   wherein the first plurality of stages is a subset of a plurality of stages associated with pipeline, and
   wherein each of the first plurality of stages of the pipeline is executed in sequence.

2. The method of claim 1, further comprising:
   obtaining a second I/O operation;
   determining a second plurality of stages of the pipeline needed to execute the second I/O operation; and
   executing each of the second plurality of stages to complete the second I/O operation,
   wherein the second plurality of stages is a subset of the plurality of stages associated with pipeline, and
   wherein each of the second plurality of stages of the pipeline is executed in sequence and the second I/O operation is executed in parallel with the first I/O operation.

3. The method of claim 2, further comprising:
   a common stage that both the first I/O operation and second I/O operation utilize, wherein the common stage is one of the plurality of stages in the pipeline; and
   executing the common stage in the first and second I/O operations,
   wherein both I/O operations execute the common stage at the same time.

4. The method of claim 1, wherein the I/O operation may be suspended at any stage in the pipeline without consuming an execution thread.

5. The method of claim 1, wherein the first I/O operation is executed asynchronously from the caller requesting the first I/O operation.

6. The method of claim 1, wherein the pipelining execution I/O is facilitated by the operation of a file system.

7. The method of claim 6, wherein the at least one of the plurality of different stages comprise at least one from the group consisting of OPEN, WAIT_CHILDREN_READY, WRITE_COMPRESS, GET_GANG_HEADER, REWRITE_GANG_MEMBERS, FREE_GANG_MEMBERS, CLAIM_GANG_MEMBERS, DVA_ALLOCATE, DVA_FREE, DVA_CLAIM, CHECKSUM_GENERATE, STAGE_READY, DVA_TRANSLATE, VDEV_IO_SETUP, VDEV_IO_START, VDEV_IO_DONE, VDEV_IO_ASSESS, WAIT_CHILDREN_DONE, CHECKSUM_VERIFY, READ_GANG_MEMBERS, READ_DECOMPRESS, and DONE.

8. A system for data management pipelining execution of I/O operations, comprising:
   a pipeline comprising a plurality of different stages, wherein the pipeline is configured to complete a plurality of I/O operations by executing the stages of the pipeline corresponding to the each of the plurality of I/O operations,
   wherein the system is configured to:
      obtain a first I/O operation of the plurality of I/O operations;
      determine a first plurality of stages of the pipeline needed to execute the first I/O operation; and
      execute each of the first plurality of stages to complete the I/O operation,
      wherein the first plurality of stages is a subset of a plurality of stages associated with pipeline, and
      wherein each of the first plurality of stages of the pipeline is executed in sequence.

9. The system of claim 8, wherein the system is further configured to: obtain a second I/O operation of the plurality of I/O operations;
   determine a second plurality of stages of the pipeline needed to execute the second I/O operation; and
   execute each of the second plurality of stages to complete the second I/O operation,
   wherein the second plurality of stages is a subset of the plurality of stages associated with pipeline, and
   wherein each of the second plurality of stages of the pipeline is executed in sequence and the second I/O operation is executed in parallel with the first I/O operation.

10. The system of claim 9, wherein the first plurality of stages and the second plurality of stages comprise a common stage that both the first I/O operation and second I/O operation use, wherein the first I/O operation and the second I/O operation execute the common stage at the same time.

11. The system of claim 8, wherein the first I/O operation may be suspended at any stage in the first plurality of stage without consuming a thread.

12. The system of claim 8, wherein the first I/O operation is executed asynchronously from the caller initiating the first I/O operation.

13. The system of claim 8, wherein the system for data management pipelining execution of I/O operations is facilitated by the operation of a file system.

14. The system of claim 8, wherein the at least one of the plurality of different stages comprise at least one from the group consisting of OPEN, WAIT_CHILDREN_READY, WRITE_COMPRESS, GET_GANG_HEADER, REWRITE_GANG_MEMBERS, FREE_GANG_MEMBERS, CLAIM_GANG_MEMBERS, DVA_ALLOCATE, DVA_FREE, DVA_CLAIM, CHECKSUM_GENERATE, STAGE_READY, DVA_TRANSLATE, VDEV_IO_SETUP, VDEV_IO_START, VDEV_IO_DONE, VDEV_IO_ASSESS, WAIT_CHILDREN_DONE, CHECKSUM_VERIFY, READ_GANG_MEMBERS, READ_DECOMPRESS, and DONE.

15. A computer usable medium having computer readable program code embodied therein for causing a computer system for executing a method for data management pipelining execution of input/output (I/O), comprising computer readable program code to:
- obtain a first I/O operation;
- determine a first plurality of stages of a pipeline needed to execute the first I/O operation; and
- execute each of the first plurality of stages to complete the I/O operation,
- wherein the first plurality of stages is a subset of a plurality of stages associated with pipeline, and
- wherein each of the first plurality of stages of the pipeline is executed in sequence.

16. The computer usable medium of claim 15, further comprising computer readable program code to:
- obtain a second I/O operation;
- determine a second plurality of stages of the pipeline needed to execute the second I/O operation; and
- execute each of the second plurality of stages to complete the second I/O operation,
- wherein the second plurality of stages is a subset of the plurality of stages associated with pipeline, and
- wherein each of the second plurality of stages of the pipeline is executed in sequence and the second I/O operation is executed in parallel with the first I/O operation.

17. The computer usable medium of claim 16, further comprising:
- a common stage that both the first I/O operation and second I/O operation use,
- wherein the common stage is one of the plurality of stages in the pipeline; and
- executing the common stage in the first and second I/O operations,
- wherein both I/O operations execute the common stage at the same time.

18. The computer usable medium of claim 15, wherein the first I/O operation may be suspended at any stage of completion without consuming a thread.

19. The computer usable medium of claim 15, wherein the first I/O operation is executed asynchronously from the caller initiating the first I/O command.

20. The computer usable medium of claim 15, wherein the method for pipelining I/O execution is used to facilitate the operation of a file system.

* * * * *